(12) United States Patent
Shakibay Senobari

(10) Patent No.: US 11,422,004 B2
(45) Date of Patent: Aug. 23, 2022

(54) INITIALIZING AN INERTIAL MEASUREMENT UNIT

(71) Applicant: Mohammad Shakibay Senobari, Tehran (IR)

(72) Inventor: Mohammad Shakibay Senobari, Tehran (IR)

(*) Notice: Subject to any disclaimer, the term of this patent is extended or adjusted under 35 U.S.C. 154(b) by 113 days.

(21) Appl. No.: 16/607,118

(22) PCT Filed: Dec. 22, 2017

(86) PCT No.: PCT/IB2017/058365
§ 371 (c)(1),
(2) Date: Oct. 22, 2019

(87) PCT Pub. No.: WO2019/122987
PCT Pub. Date: Jun. 27, 2019

(65) Prior Publication Data
US 2020/0309564 A1  Oct. 1, 2020

(51) Int. Cl.
G01C 25/00 (2006.01)
G01C 21/16 (2006.01)
G01C 21/18 (2006.01)

(52) U.S. Cl.
CPC ......... *G01C 25/005* (2013.01); *G01C 21/165* (2013.01); *G01C 21/18* (2013.01)

(58) Field of Classification Search
CPC ..... G01C 25/005; G01C 21/165; G01C 21/18
See application file for complete search history.

(56) References Cited

U.S. PATENT DOCUMENTS

| | | | | |
|---|---|---|---|---|
| 8,010,308 B1* | 8/2011 | Churchill | ............. | G01C 25/005 702/104 |
| 2011/0125404 A1* | 5/2011 | Czompo | ............... | G01C 21/165 701/472 |
| 2012/0203487 A1* | 8/2012 | Johnson | ............... | G01C 25/005 702/104 |

FOREIGN PATENT DOCUMENTS

CN  101571394 A  * 11/2009

OTHER PUBLICATIONS

Wu, Wu, Han, Liu, Hu, and Li, "Gravity Compensation using EGM2008 for High-Precision Long-Term Navigation Systems", Sensors 2016, Dec. 18, 2016 (Year: 2016).*

(Continued)

*Primary Examiner* — Natalie Huls
*Assistant Examiner* — Cynthia L Davis
(74) *Attorney, Agent, or Firm* — Bajwa IP Law Firm; Haris Zaheer Bajwa

(57) ABSTRACT

A method for initializing an inertial measurement unit (IMU). The IMU is associated with an accelerometer frame. The accelerometer frame corresponds to an inertial frame. The method includes generating variations in rows of a gravity disturbance matrix of the IMU by rotating the IMU about a rotation axis and estimating an optimal transformation matrix from the accelerometer frame to the inertial frame by minimizing the variations of the rows of the gravity disturbance matrix. The rotation axis passes through a center of the accelerometer frame. A column of the gravity disturbance matrix includes a gravity disturbance vector at an initialization moment of an initialization time. The gravity disturbance vector is associated with a gravity vector of Earth.

19 Claims, 7 Drawing Sheets

(56) References Cited

OTHER PUBLICATIONS

Fang, Chen, and Yao, "An Accurate Gravity Compensation Method for High-Precision Airborne POS", IEEE Transactions on Geoscience and Remote Sensing, vol. 52, No. 8, Aug. 8, 2014 (Year: 2014).*

* cited by examiner

INITIALIZING AN INERTIAL MEASUREMENT UNIT

CROSS-REFERENCE TO RELATED APPLICATION

This application claims the benefit of priority from international Application No. PCT/IB2017/058365, filed on Dec. 22, 2017, and entitled "ACCURATE INITIALIZATION OF STRAPDOWN INERTIAL NAVIGATION SYSTEM" which is incorporated herein by reference in its entirety.

TECHNICAL FIELD

The present disclosure generally relates to navigation systems, and particularly, to inertial measurement units.

BACKGROUND

Inertial measurement unit (IMU) is often incorporated into an inertial navigation system (INS) for positioning. An initialization may be required before utilizing an IMU. Based on the accuracy of the employed initialization, an INS may maintain the position accuracy for a certain time duration. Most IMU alignment and error estimation methods are based on development of error dynamics equations of the IMU in a navigation frame along with insertion of an observed external position/velocity (e.g., from the global positioning system (GPS)) into a Kalman filter to perform alignment and estimate IMU systematic errors. Effects of the IMU systematic errors on an IMU acceleration transformed into the navigation frame may be complicated and dynamic-dependent. Moreover, there may be high correlations between the IMU systematic errors and gravity disturbance components in the IMU error dynamics equations. Therefore, IMU estimated errors from the Kalman filter may be inaccurate and unrealistic, and may vary after each dynamic motion. In addition, because of the abovementioned correlation, accurate determination of a heading or azimuth may be difficult. Furthermore, in conventional IMU positioning methods, because of an integration error in obtaining a transformation matrix from a sensor (body) frame to the navigation frame using quaternion elements, a large cumulative error in the estimated position may remain that may act as an obstacle for precise autonomous positioning by an INS.

There is, therefore, a need for a method for obtaining accurate and stable estimates of the IMU systematic errors to be inserted into the INS after initialization in order to navigate over a long period of time while maintaining positioning accuracy. There is also a need for a method for obtaining a transformation matrix from the sensor frame to the navigation frame with a small integration error.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for initializing an inertial measurement unit (IMU). The IMU may include a plurality of accelerometers and a plurality of gyroscopes and may be associated with an accelerometer frame and a gyro frame. The accelerometer frame may include a first orthogonal set of axes, and the first orthogonal set of axes may include an $x_a$-axis, a $y_a$-axis, and a $z_a$-axis. The $z_a$-axis may be associated with a gravity vector of Earth. The gyro frame may include a second orthogonal set of axes, and the second orthogonal set of axes may include an $x_g$-axis, a $y_g$-axis, and a $z_g$-axis. The accelerometer frame and the gyro frame may correspond to an inertial frame. The inertial frame may be associated with a local optional frame. The local optional frame may include a third orthogonal set of axes. The third orthogonal set of axes may include an x-axis, a y-axis, and a z-axis. The z-axis may be associated with the gravity vector. An exemplary method includes generating variations in rows of a gravity disturbance matrix of the IMU by rotating the IMU about a rotation axis, and estimating an optimal transformation matrix from the accelerometer frame to the inertial frame by minimizing the variations of the rows of the gravity disturbance matrix of the rotated IMU. The rotation axis may pass through a center of the accelerometer frame and may be different from each of the $x_a$-axis, a $y_a$-axis, the $z_a$-axis, and the gravity vector. A column of the gravity disturbance matrix may include a gravity disturbance vector at an initialization moment of an initialization time. The gravity disturbance vector may be associated with the gravity vector.

In an exemplary embodiment, rotating the IMU about the rotation axis may include rotating the IMU about an axis making an angle larger than 30 degrees with each of the $x_a$-axis, a $y_a$-axis, the $z_a$-axis, and the gravity vector. In an exemplary embodiment, generating the variations in the rows of the gravity disturbance matrix of the IMU may include maintaining the IMU at a first orientation with respect to Earth for a first period of time, rotationally displacing the IMU back-and-forth about the rotation axis for a second period of time, maintaining the IMU at one of the first orientation and a second orientation with respect to Earth for a third period of time, and obtaining positions of the IMU by an external positioning system (EPS) during the first period of time, the second period of time, and the third period of time. The second orientation may include a 180 degree rotation of the first orientation about the $z_a$-axis. In an exemplary embodiment, rotationally displacing the IMU back-and-forth about the rotation axis may include rotating the IMU back-and-forth about the rotation axis by an angle larger than 40 degrees.

In an exemplary embodiment, minimizing the variations of the rows of the gravity disturbance matrix may include a first iterative operation. An iteration of the first iterative operation may include minimizing variations of rows of one of the gravity disturbance matrix in the local optional frame and a first residual matrix with respect to a roll angle by estimating an optimal roll angle, minimizing the variations of the rows of one of the gravity disturbance matrix in the local optional frame and the first residual matrix with respect to a pitch angle by estimating an optimal pitch angle, minimizing the variations of the rows of one of the gravity disturbance matrix in the local optional frame and the first residual matrix with respect to a yaw angle by estimating an optimal yaw angle, and calculating a coarse estimate of the optimal transformation matrix. A column of the first residual matrix may include a residual of the gravity disturbance vector in the local optional frame.

In an exemplary embodiment, minimizing the variations of the rows of one of the gravity disturbance matrix in the local optional frame and the first residual matrix with respect to the yaw angle may include minimizing a mean spectral magnitude (MSM) of a first row of one of the gravity disturbance matrix in the local optional frame and the first residual matrix with respect to the yaw angle and minimizing the MSM of a second row of one of the gravity disturbance matrix in the local optional frame and the first residual matrix with respect to the yaw angle. The first row may be associated with the x-axis and the second row may be associated with the y-axis. In an exemplary embodiment, minimizing the variations of the rows of one of the gravity disturbance matrix in the local optional frame and the first residual matrix with respect to the roll angle may include minimizing the MSM of a third row of one of the gravity disturbance matrix in the local optional frame and the first residual matrix with respect to the roll angle. The third row may be associated with the z-axis. In an exemplary embodiment, minimizing the variations of the rows of one of the gravity disturbance matrix in the local optional frame and the first residual matrix with respect to the pitch angle may include minimizing the MSM of the third row of one of the gravity disturbance matrix in the local optional frame and the first residual matrix with respect to the pitch angle.

In an exemplary embodiment, an exemplary method may further include updating the optimal transformation matrix by minimizing variations of rows of a second residual matrix. A column of the second residual matrix may include a residual of the gravity disturbance vector in the accelerometer frame.

In an exemplary embodiment, minimizing the variations of the rows of the second residual matrix may include a second iterative operation. An iteration of the second iterative operation may include minimizing the variations of the rows of the second residual matrix with respect to a roll misalignment angle by estimating an optimal roll misalignment angle, minimizing the variations of the rows of the second residual matrix with respect to a pitch misalignment angle by estimating an optimal pitch misalignment angle, minimizing the variations of the rows of the second residual matrix with respect to a yaw misalignment angle by estimating an optimal yaw misalignment angle, and calculating a fine estimate of the optimal transformation matrix.

In an exemplary embodiment, minimizing the variations of the rows of the second residual matrix with respect to the roll misalignment angle may include minimizing the MSM of a first row of the second residual matrix with respect to the roll misalignment angle and minimizing the MSM of a second row of the second residual matrix with respect to the roll misalignment angle. The first row of the second residual matrix may be associated with the $x_a$-axis and the second row of the second residual matrix may be associated with the $y_a$-axis. In an exemplary embodiment, minimizing the variations of the rows of the second residual matrix with respect to the pitch misalignment angle may include minimizing the MSM of the first row of the second residual matrix with respect to the pitch misalignment angle and minimizing the MSM of the second row of the second residual matrix with respect to the pitch misalignment angle. In an exemplary embodiment, minimizing the variations of the rows of the second residual matrix with respect to the yaw misalignment angle may include minimizing the MSM of the first row of the second residual matrix with respect to the yaw misalignment angle and minimizing the MSM of the second row of the second residual matrix with respect to the yaw misalignment angle.

In an exemplary embodiment, minimizing the variations of the rows of the second residual matrix may further include minimizing the variations of the rows of the second residual matrix with respect to a constant part of a drift error of a j-gyroscope of the plurality of gyroscopes according to a third iterative operation. The j-gyroscope may be associated with a j-axis of the gyro frame, where $j \in \{x_g, y_g, z_g\}$. An iteration of the third iterative operation may include minimizing the variations of the rows of the second residual matrix with respect to the constant part of the j-gyro drift error by estimating an optimal constant part of the j-gyro drift error, and calculating a fine estimate of the optimal transformation matrix by updating a transformation matrix $C_{g_i}^{g_o}$ from the gyro frame at an $i^{th}$ moment to the gyro frame at a starting moment of initialization.

In an exemplary embodiment, minimizing the variations of the rows of the second residual matrix with respect to the constant part of the j-gyro drift error may include minimizing the MSM of the first row of the second residual matrix with respect to the constant part of the j-gyro drift error and minimizing the MSM of the second row of the second residual matrix with respect to the constant part of the j-gyro drift error.

In an exemplary embodiment, minimizing the variations of the rows of the second residual matrix may further include minimizing the variations of the rows of the second residual matrix with respect to a constant part of a scale factor error of the j-gyroscope according to a fourth iterative operation. An iteration of the fourth iterative operation may include minimizing the MSM of the first row of the second residual matrix with respect to the constant part of the j-gyro scale factor error and minimizing the MSM of the second row of the second residual matrix with respect to the constant part of the j-gyro scale factor error by estimating an optimal constant part of the j-gyro scale factor error, and calculating a fine estimate of the optimal transformation matrix by updating the transformation matrix $C_{g_i}^{g_o}$.

In an exemplary embodiment, minimizing the variations of the rows of the second residual matrix may further include minimizing the variations of the rows of the second residual matrix with respect to a slope of the drift error of the j-gyroscope according to a fifth iterative operation. An iteration of the fifth iterative operation may include minimizing the MSM of the first row of the second residual matrix with respect to the slope of the j-gyro drift error and minimizing the MSM of the second row of the second residual matrix with respect to the slope of the j-gyro drift error by estimating an optimal slope of the j-gyro drift error, and calculating a fine estimate of the optimal transformation matrix by updating the transformation matrix $C_{g_i}^{g_o}$.

In an exemplary embodiment, minimizing the variations of the rows of the second residual matrix may further include minimizing the variations of the rows of the second residual matrix with respect to a slope of the scale factor error of the j-gyroscope according to a sixth iterative operation. An iteration of the sixth iterative operation may include minimizing the MSM of the first row of the second residual matrix with respect to the slope of the j-gyro scale factor error and minimizing the MSM of the second row of the second residual matrix with respect to the slope of the j-gyro scale factor error by estimating an optimal slope of the j-gyro scale factor error, and calculating a fine estimate of the optimal transformation matrix by updating the transformation matrix $C_{g_i}^{g_o}$.

In an exemplary embodiment, an exemplary method may further include a seventh iterative operation. An iteration of the seventh iterative operation may include minimizing the variations of the rows of the second residual matrix with respect to an x-rotational misalignment angle by estimating an optimal x-rotational misalignment angle, minimizing the variations of the rows of the second residual matrix with respect to a y-rotational misalignment angle by estimating an optimal y-rotational misalignment angle, minimizing the variations of the rows of the second residual matrix with respect to a z-rotational misalignment angle by estimating an optimal z-rotational misalignment angle, and calculating a fine estimate of the optimal transformation matrix by an optimal estimation of a transformation matrix $C_{a_i}^{g_i}$ from the accelerometer frame at the $i^{th}$ moment to the gyro frame at the $i^{th}$ moment.

In an exemplary embodiment, minimizing the variations of the rows of the second residual matrix with respect to the x-rotational misalignment angle may include minimizing the MSM of the second row of the second residual matrix with respect to the x-rotational misalignment angle. In an exemplary embodiment, minimizing the variations of the rows of the second residual matrix with respect to the y-rotational misalignment angle may include minimizing the MSM of the first row of the second residual matrix with respect to the y-rotational misalignment angle. In an exemplary embodiment, minimizing the variations of the rows of the second residual matrix with respect to the z-rotational misalignment angle may include minimizing the MSM of the first row of the second residual matrix with respect to the z-rotational misalignment angle and minimizing the MSM of the second row of the second residual matrix with respect to the z-rotational misalignment angle.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method for initializing an inertial measurement unit (IMU). The IMU may include a number of gyroscopes and accelerometers. The exemplary method may estimate an orientation of the IMU with respect to an inertial space and errors in the output data of the gyroscopes by generating large variations in gravity disturbance components via back-and-forth rotational displacements of the IMU, and subsequently minimizing the generated variations via performing iterative calculations.

Figure 1A:
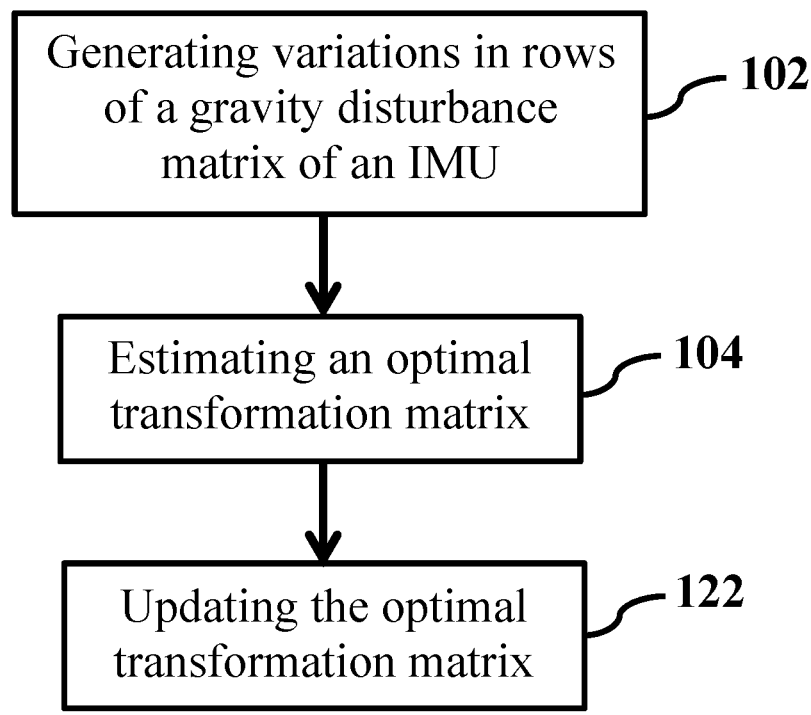
FIG. 1A shows a flowchart of an exemplary method for initializing an inertial measurement unit (IMU), consistent with one or more exemplary embodiments of the present disclosure.
Figure 2:
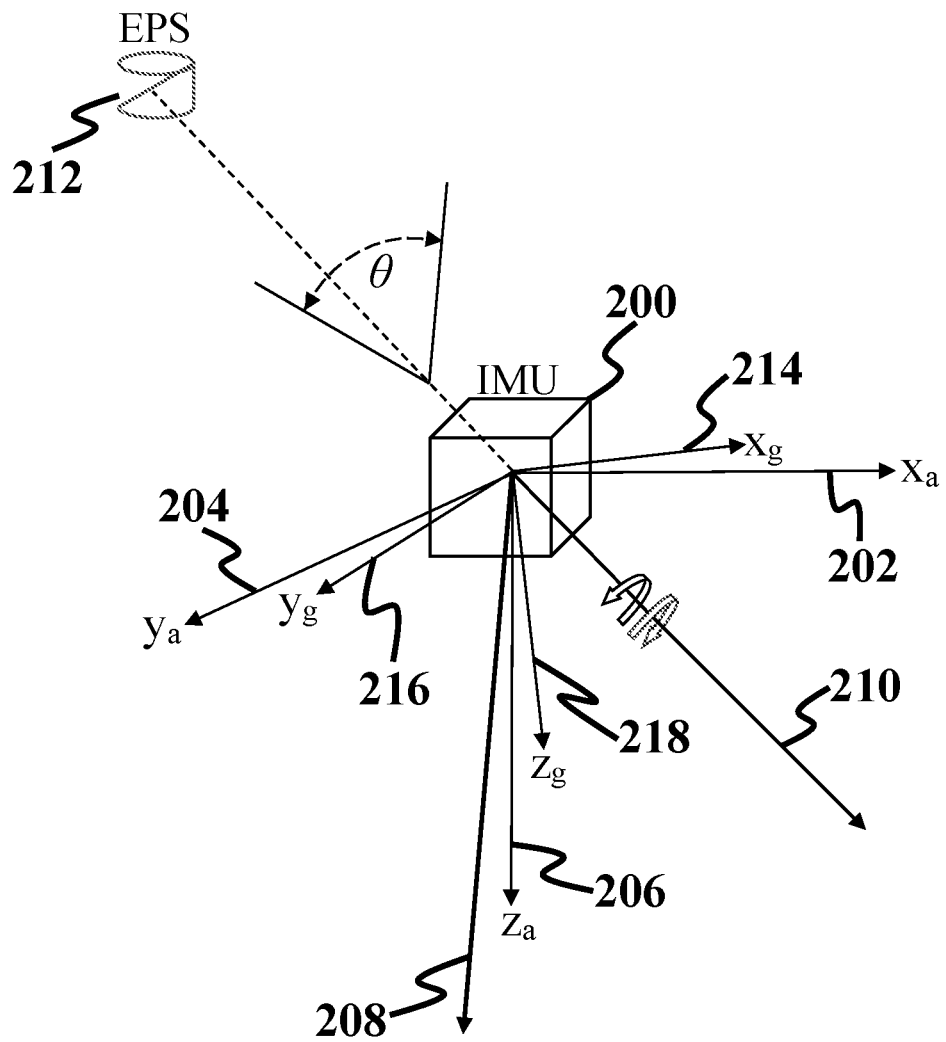
FIG. 2 shows a schematic of an exemplary IMU, consistent with one or more exemplary embodiments of the present disclosure.

FIG. 1A shows a flowchart of an exemplary method 100 for initializing an inertial measurement unit (IMU), consistent with one or more exemplary embodiments of the present disclosure. FIG. 2 shows a schematic of an exemplary IMU 200, consistent with one or more exemplary embodiments of the present disclosure. Exemplary method 100 may be utilized for initializing IMU 200. In an exemplary embodiment, IMU 200 may include a plurality of accelerometers and a plurality of gyroscopes and may be associated with an accelerometer frame and a gyro frame. In an exemplary embodiment, the accelerometer frame may include a first orthogonal set of axes, and the first orthogonal set of axes may include an $x_a$-axis 202, a $y_a$-axis 204, and a $z_a$-axis 206. The accelerometer frame may be associated with sensitive axes of the plurality of accelerometers. In an exemplary embodiment, $z_a$-axis 206 may be downward (or upward) along a gravity vector 208 outside the back-and-forth rotational displacements. In an exemplary embodiment, the gyro frame may include a second orthogonal set of axes, and the second orthogonal set of axes may include an $x_g$-axis 214, a $y_g$-axis 216, and a $z_g$-axis 218. The gyro frame may be associated with sensitive axes of the plurality of gyroscopes. In an exemplary embodiment, the accelerometer frame and the gyro frame may be right-handed. The accelerometer frame and the gyro frame may correspond to an inertial frame. The inertial frame may be defined as a right-handed frame attached to a center of a nonrotating Earth. The inertial frame may be associated with an Earth-centered-Earth-fixed (ECEF) frame. The plurality of gyroscopes mounted on a moving object may sense the rotation angle increments of the moving object during time increments about their sensitive axes with respect to the inertial frame.

Changes in orientation of IMU 200 during rotational motions may create variations in the gravity disturbance components. Misalignment errors (errors in an orientation of the gyro frame with respect to the inertial frame) and gyro errors may amplify these created variations. Therefore, minimizing the variations in the gravity disturbance components may lead to an accurate alignment and estimation of gyro errors of IMU 200. The accurate alignment of IMU 200 may be defined by the accurate estimation of the orientation of IMU 200 with respect to the inertial frame. To achieve this goal, IMU 200 may undergo a rotational motion to create variations in the gravity disturbance components. The rotational motion may include some simultaneous or non-simultaneous rotations about different rotation axes to generate variations in the gravity disturbance components. In an exemplary embodiment, the rotational motion may include a back-and-forth rotation about a rotation axis passing through a center of the accelerometer frame. The back-and-forth rotation may be performed about any arbitrary axis but away from both the gravity vector and axes of the accelerometer frame to produce large variations in all components of an IMU-sensed acceleration vector during the back-and-forth rotation. In a case of a static alignment, IMU 200 may be rotated about an axis that is away from both the axes of the accelerometer frame and the gravity vector while IMU 200 is stationary. In a case of an in-motion alignment, IMU 200 may move for some time (i.e., an initialization time) while performing the back-and-forth rotation.

Referring to FIGS. 1A and 2, in an exemplary embodiment, method 100 may include generating variations in rows of a gravity disturbance matrix of IMU 200 by rotating IMU 200 about a rotation axis 210 (step 102), and estimating an optimal transformation matrix from the accelerometer frame to the inertial frame by minimizing the variations of the rows of the gravity disturbance matrix of the rotated IMU (step 104). In an exemplary embodiment, rotation axis 210 may pass through the center of the accelerometer frame and may not be aligned with any of $x_a$-axis 202, $y_a$-axis 204, $z_a$-axis 206, and gravity vector 208. In an exemplary embodiment, the inertial frame may be associated with a local optional frame. The local optional frame may be an Earth-referenced frame and may include a third orthogonal set of axes. The third orthogonal set of axes may include an x-axis, a y-axis, and a z-axis. The z-axis may be close to gravity vector 208 such that a small angle may be created between the z-axis and gravity vector 208. In an exemplary embodiment, the local optional frame may include a navigation frame (a north-east-down frame). The navigation frame is associated with the inertial frame. In an exemplary embodiment, for initialization of IMU 200 in a polar region of Earth, the local optional frame may include the ECEF frame. In an exemplary embodiment, a column of the gravity disturbance matrix may include a gravity disturbance vector at an initialization moment of the initialization time. The gravity disturbance vector may be associated with gravity vector 208.

In an exemplary embodiment, rotating IMU 200 about rotation axis 210 may include rotating IMU 200 about an axis making an angle larger than 30 degrees with each of $x_a$-axis 202, $y_a$-axis 204, $z_a$-axis 206, and gravity vector 208. For example, rotation axis 210 may make an angle of 60 degrees with each of $x_a$-axis 202, $y_a$-axis 204, and $z_a$-axis 206. In an exemplary embodiment, rotating IMU 200 back-and-forth about rotation axis 210 may include rotating IMU 200 back-and-forth by a rotation angle θ. Rotation angle θ may be large enough to create noticeable variations in the rows of the gravity disturbance matrix. For example, rotation angle θ may be larger than 40 degrees.

Figure 1B:
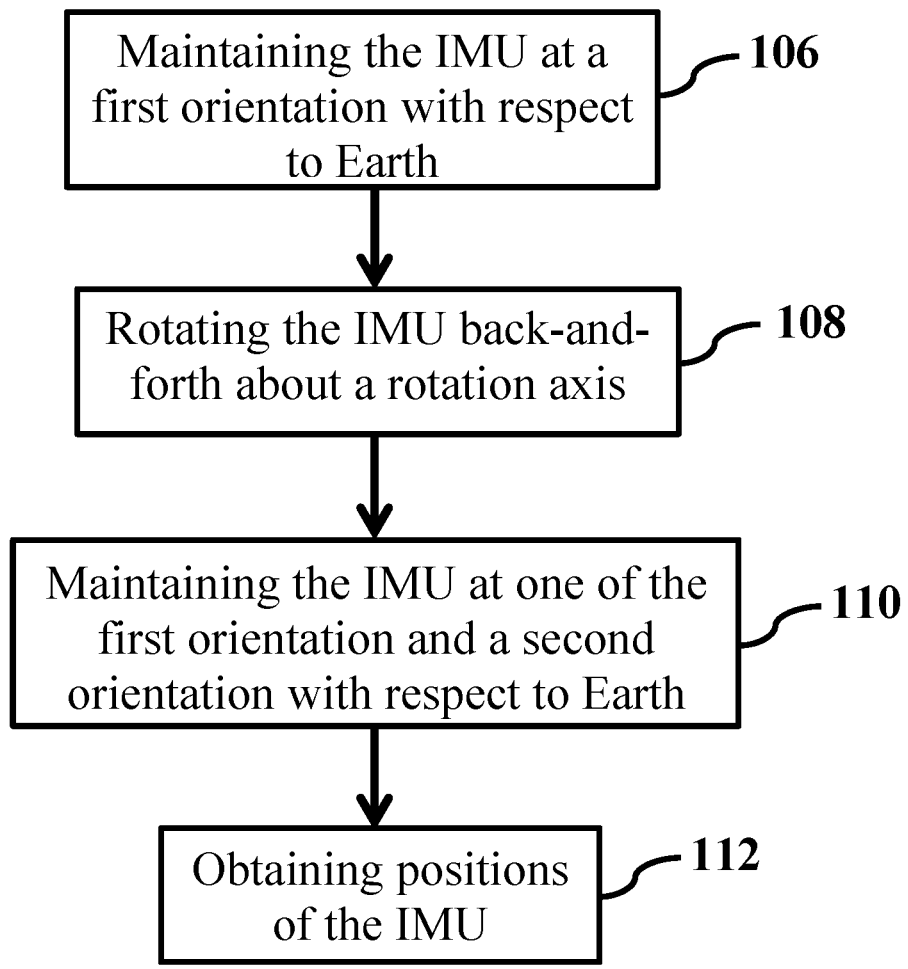
FIG. 1B shows a flowchart of exemplary steps of generating variations in a gravity disturbance matrix, consistent with one or more exemplary embodiments of the present disclosure.

FIG. 1B shows a flowchart of exemplary steps of generating variations in the rows of the gravity disturbance matrix of IMU 200, consistent with one or more exemplary embodiments of the present disclosure. In an exemplary embodiment, step 102 may include maintaining IMU 200 at a first orientation with respect to Earth for a first period of time (step 106), rotationally displacing IMU 200 back-and-forth about rotation axis 210 for a second period of time (step 108), maintaining IMU 200 at one of the first orientation and a second orientation with respect to Earth for a third period of time (step 110), and obtaining positions of IMU 200 by an external positioning system (EPS) 212 during the first period of time, the second period of time, and the third period of time (step 112). The second orientation may be a 180 degree rotation of the first orientation about $z_a$-axis 206. In an exemplary embodiment, EPS 212 may be fixed to IMU 200 and may rotate together with IMU 200 about rotation axis 210. In an exemplary embodiment, for a case that the rotationally displacing IMU 200 may include back-and-forth rotations about one rotation axis, to avoid restriction of rotation of EPS 212 about rotation axis 210, EPS 212 may be installed on rotation axis 210.

In an exemplary embodiment, the back-and-forth rotational displacements may create variations in the rows of the gravity disturbance matrix of IMU 200 during the second period of time. Since short-term variations of the gravity disturbance matrix may be corrupted by high-frequency errors, an IMU initialization based on minimization of the short-term variations may be inaccurate. Hence, minimization of medium- to long-term variations may be a concern for performing the IMU initialization. Therefore, prior to minimization of the variations, a smoothing by, for example, a low-pass filter in a frequency domain may be required to reduce the high-frequency errors of the variations. Frequency spectrum of the variations may include frequencies of a back-and-forth rotational motion of IMU 200. Since the variations with the frequencies of the back-and-forth rotational motion should not be removed by smoothing, depending on a required IMU alignment accuracy and noise of EPS 212 and IMU 200, the second period of time may be chosen large enough to create required medium- to long-term variations. Moreover, in order to optimally smooth the variations, enough time at both sides of the second period of time may be required. Therefore, depending on the second period of time, the first period of time and the third period of time may also be chosen large enough.

Figure 1C:
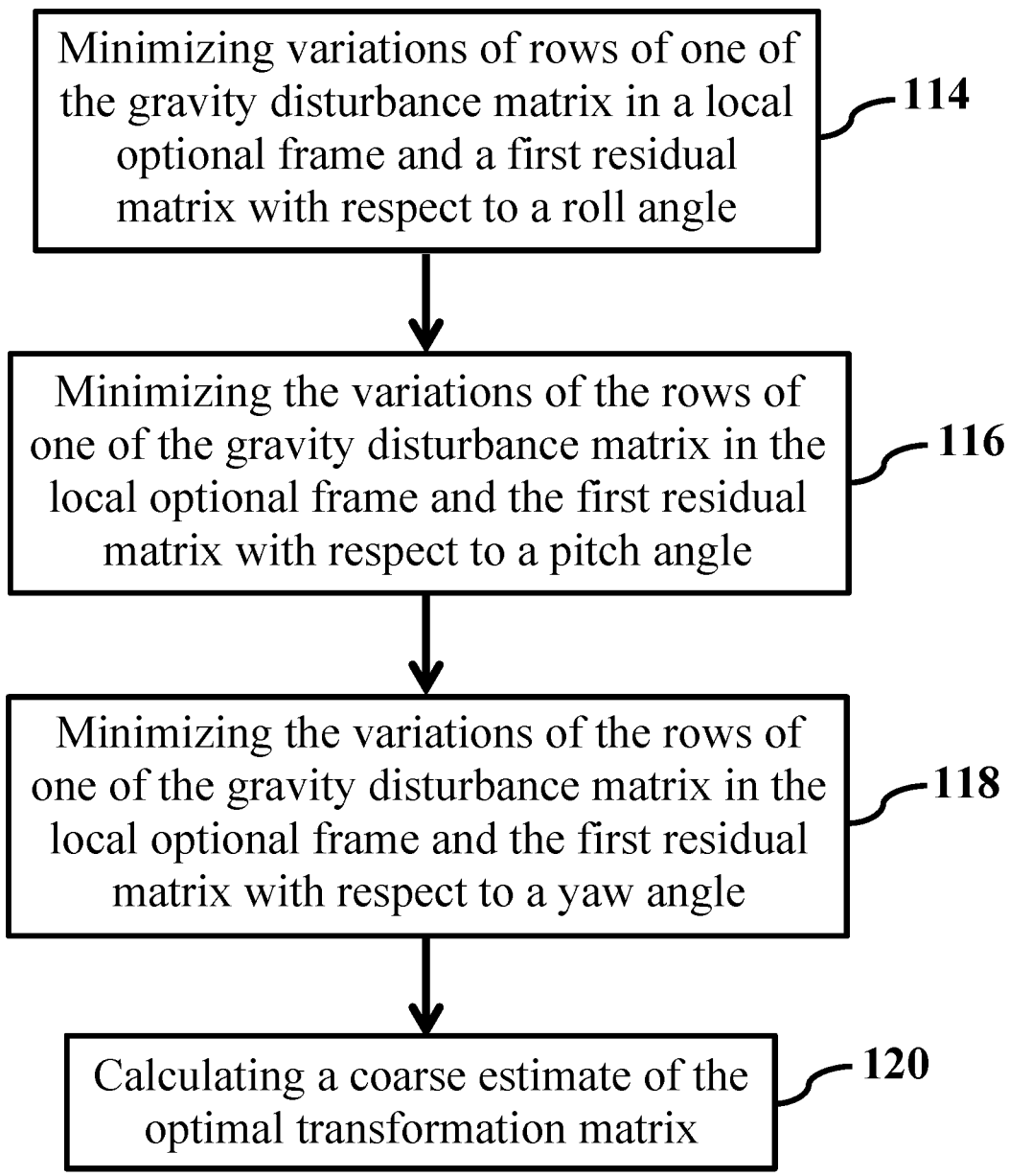
FIG. 1C shows a flowchart of exemplary steps of minimizing variations of rows of the gravity disturbance matrix, consistent with one or more exemplary embodiments of the present disclosure.

FIG. 1C shows a flowchart of exemplary steps of minimizing the variations of the rows of the gravity disturbance matrix, consistent with one or more exemplary embodiments of the present disclosure. In an exemplary embodiment, step 104 may include minimizing the variations of the rows of the gravity disturbance matrix. In an exemplary embodiment, minimizing the variations of the rows of the gravity disturbance matrix may include a first iterative operation. A $k^{th}$ iteration of the first iterative operation may include minimizing variations of rows of one of the gravity disturbance matrix in the local optional frame and a first residual matrix with respect to a roll angle by estimating an optimal roll angle $OA_{roll}$ (step 114), minimizing the variations of the rows of one of the gravity disturbance matrix in the local optional frame and the first residual matrix with respect to a pitch angle by estimating an optimal pitch angle $OA_{pitch}$ (step 116), minimizing the variations of the rows of one of the gravity disturbance matrix in the local optional frame and the first residual matrix with respect to a yaw angle by estimating an optimal yaw angle $OA_{yaw}$ (step 118), and calculating a coarse estimate of the optimal transformation matrix by calculating a coarse estimate of a transformation matrix $C_{g_o}^{\ i}$ from the gyro frame at a starting moment of initialization to the inertial frame (step 120). A column of the first residual matrix may include a residual of the gravity disturbance vector in the local optional frame. In an exemplary embodiment, the coarse estimate of the transformation matrix $C_{g_o}^{\ i}$ may be calculated according to a recursive operation defined by the following:

$$C_{g_o,k}^{\ i} = mul(C_{g_o,k-1}^{\ i}, R_x(OA_{roll}), R_y(OA_{pitch}), R_z(OA_{yaw})), \quad \text{Equation (1)}$$

where:

$C_{g_o,k-1}^{\ i}$ is a value of the transformation matrix $C_{g_o}^{\ i}$ at a $(k-1)^{th}$ iteration of the first iterative operation, wherein $C_{g_o,0}^{\ i}$ is set to an identity matrix, $R_x(OA_{roll})$ is a rotation matrix representing a rotation about $x_g$-axis 214 by an angle of $OA_{roll}$, $R_y(OA_{pitch})$ is a rotation matrix representing a rotation about $y_g$-axis 216 by an angle of $OA_{pitch}$, $R_z(OA_{yaw})$ is a rotation matrix representing a rotation about $z_g$-axis 218 by an angle of $OA_{yaw}$, and $mul(C_{g_o,k-1}^{\ i}, R_x(OA_{roll}), R_y(OA_{pitch}), R_z(OA_{yaw}))$ is a multiplication of matrices $C_{g_o,k-1}^{\ i}, R_x(OA_{roll}), R_y(OA_{pitch})$, and $R_z(OA_{yaw})$. The order of the multiplication of the matrices may be arbitrarily chosen and may remain unchanged during iterations of the first iterative operation.

In an exemplary embodiment, estimating the optimal transformation matrix $C_a^{\ i}$ from the accelerometer frame to the inertial frame (step 104) may include estimating a transformation matrix $C_{g_i}^{\ g_o}$ from the gyro frame at an $i^{th}$ moment to the gyro frame at the starting moment of initialization, according to an operation defined by the following:

$$C_{g_i}^{\ g_o} = C_{g_1}^{\ g_o} C_{g_2}^{\ g_1} C_{g_3}^{\ g_2} \ldots C_{g_i}^{\ g_{i-1}}, \quad \text{Equation (2)}$$

where $C_{g_i}^{\ g_{i-1}}$ is a transformation matrix from the gyro frame at the $i^{th}$ moment to the gyro frame at an $(i-1)^{th}$ moment. In an exemplary embodiment, the transformation matrix $C_{g_i}^{\ g_{i-1}}$ may be given by the following:

$$C_{g_i}^{\ g_{i-1}} = (R_x R_y R_z + R_x R_z R_y + R_y R_x R_z + R_y R_z R_x + R_z R_x R_y + R_z R_y R_x)^T / 6, \quad \text{Equation (3)}$$

where:

$R_x$ is a rotation matrix representing a rotation about $x_g$-axis 214 by an incremental rotation angle $d\theta_x$ sensed by an $x_g$-gyroscope of the plurality of gyroscopes during a time increment from the $(i-1)^{th}$ moment to the $i^{th}$ moment, $R_y$ is a rotation matrix representing a rotation about $y_g$-axis 216 by an incremental rotation angle $d\theta_y$ sensed by a $y_g$-gyroscope of the plurality of gyroscopes during the time increment, and $R_z$ is a rotation matrix representing a rotation about $z_g$-axis 218 by an incremental rotation angle $d\theta_z$ sensed by a $z_g$-gyroscope of the plurality of gyroscopes during the time increment. The $x_g$-gyroscope may be associated with $x_g$-axis 214, the $y_g$-gyroscope may be associated with $y_g$-axis 216, and the $z_g$-gyroscope may be associated with $z_g$-axis 218.

In an exemplary embodiment, for a right-handed gyro frame for which a counterclockwise incremental rotation angle sensed by a gyroscope is supposed to be a positive value, the rotation matrices $R_x$, $R_y$, and $R_z$ for a case that the gyro frame rotates may be given by the following:

$$R_x = \begin{bmatrix} 1 & 0 & 0 \\ 0 & \cos(d\theta_x) & \sin(d\theta_x) \\ 0 & -\sin(d\theta_x) & \cos(d\theta_x) \end{bmatrix}, \quad \text{Equation (4a)}$$

$$R_y = \begin{bmatrix} \cos(d\theta_y) & 0 & -\sin(d\theta_y) \\ 0 & 1 & 0 \\ \sin(d\theta_y) & 0 & \cos(d\theta_y) \end{bmatrix}, \quad \text{Equation (4b)}$$

$$R_z = \begin{bmatrix} \cos(d\theta_z) & \sin(d\theta_z) & 0 \\ -\sin(d\theta_z) & \cos(d\theta_z) & 0 \\ 0 & 0 & 1 \end{bmatrix}. \quad \text{Equation (4c)}$$

In an exemplary embodiment, minimizing the variations of the rows of the gravity disturbance matrix in the local optional frame in step 104 may include minimizing variations of rows of a matrix $[\delta g^l]$, a column of the matrix $[\delta g^l]$ at the $i^{th}$ moment given by the following equation that is derived based on Newton's second law of motion:

$$\delta g^l = C_i^l \ddot{x}^i - C_i^l C_{g_o}^{\ i} C_{g_i}^{\ g_o} C_{a_i}^{\ g_i} a^a - C_i^l \gamma^i, \quad \text{Equation (5)}$$

where:

$\delta g^l$ is the gravity disturbance vector in the local optional frame at the $i^{th}$ moment, $C_i^l$ is a transformation matrix from the inertial frame at the $i^{th}$ moment to the local optional frame at the $i^{th}$ moment, $\ddot{x}^i$ is an EPS-derived acceleration vector in the inertial frame associated with IMU 200 at the $i^{th}$ moment, which may be obtained by double differentiation of an EPS-derived position in the inertial frame, $C_{g_o}^{\ i}$ is a transformation matrix from the gyro frame at the starting moment of initialization to the inertial frame at the $i^{th}$ moment, $C_{g_i}^{\ g_o}$ is a transformation matrix from the gyro frame at the $i^{th}$ moment to the gyro frame at the starting moment, $C_{a_i}^{\ g_i}$ is a transformation matrix from the accelerometer frame at the $i^{th}$ moment to the gyro frame at the $i^{th}$ moment, $a^a$ is the IMU-sensed acceleration vector in the accelerometer frame at the $i^{th}$ moment, and $\gamma^i$ is a normal gravity vector corrected for a centrifugal acceleration of Earth in the inertial frame at the $i^{th}$ moment.

In an exemplary embodiment, steps 114, 116, and 118 may include minimizing the variations of the rows of the first residual matrix. In an exemplary embodiment, minimizing the variations of the rows of the first residual matrix may include minimizing variations of rows of a matrix $[Err^l]$, a column of the matrix $[Err^l]$ at the $i^{th}$ moment given by the following:

$$Err^l = C_i^l \ddot{x}^i - C_i^l C_{g_o}^{\ i} C_{g_i}^{\ g_o} C_{a_i}^{\ g_i} a^a - C_i^l \gamma^i - C_i^l \delta g_{EGD}^{\ i}, \quad \text{Equation (6)}$$

where $Err^l$ is the residual of the gravity disturbance vector in the local optional frame at the $i^{th}$ moment, and $\delta g_{EGD}^{\ i}$ is an external gravity disturbance (EGD) vector in the inertial frame at the $i^{th}$ moment. In an exemplary embodiment, $\delta g_{EGD}^{\ i}$ may be extracted from an Earth gravity model (EGM). In Equation (6), through minimization of the gravity disturbance variations, all matrices and vectors may be known and fixed, except for $C_{g_o}^{\ i}$, which may vary such that the variations in the rows of $[Err^l]$ are minimized during rotational motions.

In an exemplary embodiment, minimizing the variations of the rows of one of the gravity disturbance matrix in the local optional frame and the first residual matrix with respect to the yaw angle (step 118) may include minimizing a mean spectral magnitude (MSM) of a first row of one of the gravity disturbance matrix in the local optional frame and the first residual matrix with respect to the yaw angle and minimizing the MSM of a second row of one of the gravity disturbance matrix in the local optional frame and the first residual matrix with respect to the yaw angle. The first row may be associated with the x-axis and the second row may be associated with the y-axis. In an exemplary embodiment, an average of two values of the yaw angle for which the MSMs of the first row and the second row are minimized may be calculated to obtain the optimal yaw angle $OA_{yaw}$. In an exemplary embodiment, minimizing the variations of the rows of one of the gravity disturbance matrix in the local optional frame and the first residual matrix with respect to the roll angle (step 114) may include minimizing the MSM of a third row of one of the gravity disturbance matrix in the local optional frame and the first residual matrix with respect to the roll angle to obtain the optimal roll angle $OA_{roll}$. The third row may be associated with the z-axis. In an exemplary embodiment, minimizing the variations of the rows of one of the gravity disturbance matrix in the local optional frame and the first residual matrix with respect to the pitch angle (step 116) may include minimizing the MSM of the third row of one of the gravity disturbance matrix in the local optional frame and the first residual matrix with respect to the pitch angle to obtain the optimal pitch angle $OA_{pitch}$. The MSM of a vector v with equally-spaced elements in a time domain (which may be replaced by any of the first row, the second row, and the third row) may be given by the following:

$$MSM(v) = \frac{\left(\sum_{m=0}^{M-1} \sqrt{(a_m^2 + b_m^2)}\right)}{M}, \quad \text{Equation (7)}$$

where $a_m$ and $b_m$ are real and imaginary parts of a discrete Fourier transform of v in the frequency domain, respectively, and M is a number of elements of v. $a_m$ and $b_m$ are also known as components of a Fourier spectrum of v. Frequency spectrum of the gravity disturbance matrix may include frequencies of the back-and-forth rotational motion of IMU 200. In an exemplary embodiment, the minimum variations for the rows of the gravity disturbance matrix may be obtained when a minimum spectral magnitude and a zero phase shift occur for spectra of the rows of the gravity disturbance matrix. A phase shift may be related to a time delay between EPS 212 and IMU 200.

The coarse estimate of the transformation matrix $C_{g_o}{}^i$ may yield a coarse estimate for the optimal transformation matrix $C_a{}^i$ which may be corrupted by remaining misalignments due to IMU systematic errors. In an exemplary embodiment, more accurate estimation of the optimal transformation matrix $C_a{}^i$ may be obtained by estimating the gyro errors and compensating the remaining misalignments due to the IMU systematic errors.

Referring back to FIG. 1A, in an exemplary embodiment, method 100 may further include updating the optimal transformation matrix (step 122) by minimizing variations of rows of a second residual matrix. A column of the second residual matrix may include a residual of the gravity disturbance vector in the accelerometer frame.

Figure 1D:
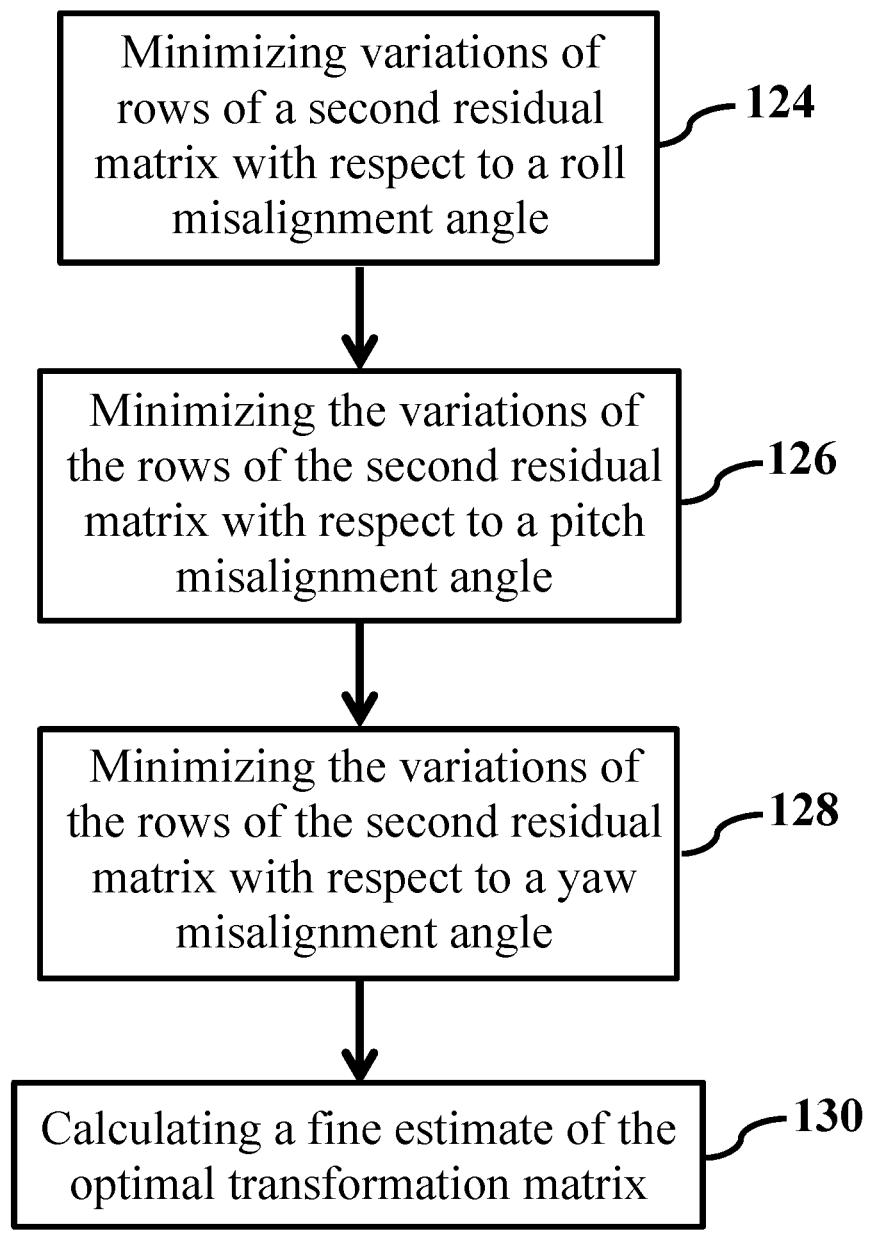
FIG. 1D shows a flowchart of exemplary steps of minimizing variations of rows of a residual of the gravity disturbance matrix, consistent with one or more exemplary embodiments of the present disclosure.

FIG. 1D shows a flowchart of exemplary steps of minimizing the variations of the rows of the second residual matrix, consistent with one or more exemplary embodiments of the present disclosure. In an exemplary embodiment, step 122 may include minimizing the variations of the rows of the second residual matrix. In an exemplary embodiment, minimizing the variations of the rows of the second residual matrix may include a second iterative operation. An $l^{th}$ iteration of the second iterative operation may include minimizing the variations of the rows of the second residual matrix with respect to a roll misalignment angle by estimating an optimal roll misalignment angle $OMA_{roll}$ (step 124), minimizing the variations of the rows of the second residual matrix with respect to a pitch misalignment angle by estimating an optimal pitch misalignment angle $OMA_{pitch}$ (step 126), minimizing the variations of the rows of the second residual matrix with respect to a yaw misalignment angle by estimating an optimal yaw misalignment angle $OMA_{yaw}$ (step 128), and calculating a fine estimate of the optimal transformation matrix by calculating a fine estimate of the transformation matrix $C_{g_o}{}^i$ (step 130). In an exemplary embodiment, the fine estimate of the transformation matrix $C_{g_o}{}^i$ may be calculated according to a recursive operation defined by the following:

$$C_{g_o,l}{}^i = mul(C_{g_o,l-1}{}^i, R_x(OMA_{roll}), R_y(OMA_{pitch}), R_z(OMA_{yaw})), \quad \text{Equation (8)}$$

where:
$C_{g_o,l-1}{}^i$ is a value of the transformation matrix $C_{g_o,l}{}^i$ at an $(l-1)^{th}$ iteration of the second iterative operation, wherein $C_{g_o,0}{}^i$ is set to the coarse estimate of the transformation matrix $C_{g_o}{}^i$,
$R_x(OMA_{roll})$ is a rotation matrix representing a rotation about $x_g$-axis 214 by an angle of $OMA_{roll}$,
$R_y(OMA_{pitch})$ is a rotation matrix representing a rotation about $y_g$-axis 216 by an angle of $OMA_{pitch}$,
$R_z(OMA_{yaw})$ is a rotation matrix representing a rotation about $z_g$-axis 218 by an angle of $OMA_{yaw}$, and
$mul(C_{g_o,l-1}{}^i, R_x(OMA_{roll}), R_y(OMA_{pitch}), R_z(OMA_{yaw}))$ is a multiplication of matrices $C_{g_o,l-1}{}^i$, $R_x(OMA_{roll})$, $R_y(OMA_{pitch})$, and $R_z(OMA_{yaw})$. The order of the multiplication of the matrices may be same as the order of the multiplication of the matrices used in Equation (1).

In an exemplary embodiment, minimizing the variations of the rows of the second residual matrix with respect to the roll misalignment angle (step 124) may include minimizing the MSM of a first row of the second residual matrix with respect to the roll misalignment angle and minimizing the MSM of a second row of the second residual matrix with respect to the roll misalignment angle. The first row of the second residual matrix may be associated with $x_a$-axis 202 and the second row of the second residual matrix may be associated with $y_a$-axis 204. In an exemplary embodiment, an average of two values of the roll misalignment angle for which the MSMs of the first row and the second row of the second residual matrix are minimized may be calculated to obtain the optimal roll misalignment angle $OMA_{roll}$. In an exemplary embodiment, minimizing the variations of the rows of the second residual matrix with respect to the pitch misalignment angle (step 126) may include minimizing the MSM of the first row of the second residual matrix with respect to the pitch misalignment angle and minimizing the MSM of the second row of the second residual matrix with respect to the pitch misalignment angle. In an exemplary embodiment, an average of two values of the pitch misalignment angle for which the MSMs of the first row and the second row of the second residual matrix are minimized may be calculated to obtain the optimal pitch misalignment angle OMA$_{pitch}$. In an exemplary embodiment, minimizing the variations of the rows of the second residual matrix with respect to the yaw misalignment angle (step 128) may include minimizing the MSM of the first row of the second residual matrix with respect to the yaw misalignment angle and minimizing the MSM of the second row of the second residual matrix with respect to the yaw misalignment angle. In an exemplary embodiment, an average of two values of the yaw misalignment angle for which the MSMs of the first row and the second row of the second residual matrix are minimized may be calculated to obtain the optimal yaw misalignment angle OMA$_{yaw}$.

In an exemplary embodiment, minimizing the variations of the rows of the second residual matrix in step 122 may include minimizing variations of rows of a matrix [Err$^a$], a column of the matrix [Err$^a$] at the i$^{th}$ moment given by the following:

$$Err^a = (C_{g_o}{}^i C_{g_i}{}^{g_o} C_{a_i}{}^{g_i})^{-1}(\ddot{x}^i - \gamma^i - \delta g_{EGD}{}^i) - a^a, \quad \text{Equation (9)}$$

where Err$^a$ is the residual of the gravity disturbance vector in the accelerometer frame at the i$^{th}$ moment. In Equation (9), through each iteration of iterative operations, the acceleration vectors ($\ddot{x}^i - \gamma^i - \delta g_{EGD}{}^i$) and $a^a$ may remain unchanged, whereas misalignment angles, the gyro errors, and rotational misalignment angles in $C_{g_o}{}^i$, $C_{g_i}{}^{g_o}$, and $C_{a_i}{}^{g_i}$ may change, respectively, such that the variations in the rows of the second residual matrix [Err$^a$] are minimized during back-and-forth rotational motions. In an exemplary embodiment, putting aside errors in the transformation matrices $C_{g_o}{}^i$, $C_{g_i}{}^{g_o}$, and $C_{a_i}{}^{g_i}$, the second residual matrix [Err$^a$] may include errors stemming from the plurality of accelerometers, errors in the EGD vector, and high-frequency errors of the EPS-derived acceleration vector.

In an exemplary embodiment, minimizing the variations of the rows of the second residual matrix in steps 124, 126, and 128 may further include minimizing the variations of the rows of the second residual matrix with respect to a constant part of a drift error of a j-gyroscope of the plurality of gyroscopes according to a third iterative operation. The j-gyroscope may be associated with a j-axis of the gyro frame, where j∈{x$_g$, y$_g$, z$_g$}. An r$^{th}$ iteration of the third iterative operation may include minimizing the variations of the rows of the second residual matrix with respect to the constant part of the j-gyro drift error by estimating an optimal constant part ocgd$_j$ of the j-gyro drift error, and calculating a fine estimate of the optimal transformation matrix (step 130) by updating the transformation matrix $C_{g_i}{}^{g_o}$ according to a set of recursive operations defined by the following:

$$C_{g_i,r}{}^{g_o} = C_{g_i,r-1}{}^{g_o} + \Sigma_{j\in\{x_g,y_g,z_g\}} ocgd_j \dot{C}_{g_i}{}^{g_o}(d\theta_j), \quad \text{Equation (10a)}$$

$$fcgd_{j,r} = fcgd_{j,r-1} + ocgd_j, \quad \text{Equation (10b)}$$

where:
- $C_{g_i,r-1}{}^{g_o}$ is a value of the transformation matrix $C_{g_i}{}^{g_o}$ at an (r−1)$^{th}$ iteration of the third iterative operation, wherein $C_{g_i,0}{}^{g_o}$ is set to $C_{g_i}{}^{g_o}$,
- $\dot{C}_{g_i}{}^{g_o}(d\theta_j)$ is a first derivative of the transformation matrix $C_{g_i}{}^{g_o}$ with respect to an incremental rotation angle d$\theta_j$ sensed by the j-gyroscope, and
- fcgd$_{j,r-1}$ is a final estimate of the constant part of the j-gyro drift error after r−1 iterations of the third iterative operation, wherein fcgd$_{j,0}$ is set to zero.

In an exemplary embodiment, minimizing the variations of the rows of the second residual matrix with respect to the constant part of the j-gyro drift error may include minimizing the MSM of the first row of the second residual matrix with respect to the constant part of the j-gyro drift error and minimizing the MSM of the second row of the second residual matrix with respect to the constant part of the j-gyro drift error. In an exemplary embodiment, an average of two values of the constant part of the j-gyro drift error for which the MSMs of the first row and the second row of the second residual matrix are minimized may be calculated to obtain the optimal constant part ocgd$_j$ of the j-gyro drift error.

Equation (10a) may be obtained by a first-order Taylor expansion of the transformation matrix $C_{g_i}{}^{g_o}$ about d$\theta_j$ by ocgd$_j$. A higher order expansion may also lead to similar results for estimation of the constant part of the j-gyro drift error with a higher computational cost.

In an exemplary embodiment, minimizing the variations of the rows of the second residual matrix in steps 124, 126, and 128 may further include minimizing the variations of the rows of the second residual matrix with respect to a constant part of a scale factor error of the j-gyroscope according to a fourth iterative operation. A q$^{th}$ iteration of the fourth iterative operation may include minimizing the MSM of the first row of the second residual matrix with respect to the constant part of the j-gyro scale factor error and minimizing the MSM of the second row of the second residual matrix with respect to the constant part of the j-gyro scale factor error by estimating an optimal constant part ocgsf$_j$ of the j-gyro scale factor error, and calculating a fine estimate of the optimal transformation matrix (step 130) by updating the transformation matrix $C_{g_i}{}^{g_o}$ according to a set of recursive operations defined by the following:

$$C_{g_i,q}{}^{g_o} = C_{g_i,q-1}{}^{g_o} + \Sigma_{j\in\{x_g,y_g,z_g\}} ocgsf_j d\theta_{j,i} \dot{C}_{g_i}{}^{g_o}(d\theta_j), \quad \text{Equation (11a)}$$

$$fcgsf_{j,q} = fcgsf_{j,q-1} + ocgsf_j, \quad \text{Equation (11b)}$$

where:
- $C_{g_i,q-1}{}^{g_o}$ is an updated value of the transformation matrix $C_{g_i}{}^{g_o}$ at a (q−1)$^{th}$ iteration of the fourth iterative operation,
- d$\theta_{j,i}$ is an incremental rotation angle sensed by the j-gyroscope during the time increment from the (i−1)$^{th}$ moment to the i$^{th}$ moment, and
- fcgsf$_{j,q-1}$ is a final estimate of the constant part of the j-gyro scale factor error after q−1 iterations of the fourth iterative operation, wherein fcgsf$_{j,0}$ is set to zero.

In an exemplary embodiment, an average of two values of the constant part of the j-gyro scale factor error for which the MSMs of the first row and the second row of the second residual matrix are minimized may be calculated to obtain the optimal constant part ocgsf$_j$ of the j-gyro scale factor error.

Equation (11a) may be obtained by the first-order Taylor expansion of the transformation matrix $C_{g_i}{}^{g_o}$ about d$\theta_j$ by ocgsf$_j$d$\theta_{j,i}$. The higher order expansion may also lead to similar results for estimation of the constant part of the j-gyro scale factor error with a higher computational cost.

In an exemplary embodiment, minimizing the variations of the rows of the second residual matrix in steps 124, 126, and 128 may further include minimizing the variations of the rows of the second residual matrix with respect to a slope of the drift error of the j-gyroscope according to a fifth iterative operation. An m$^{th}$ iteration of the fifth iterative operation may include minimizing the MSM of the first row of the second residual matrix with respect to the slope of the j-gyro drift error and minimizing the MSM of the second row of the second residual matrix with respect to the slope of the j-gyro drift error by estimating an optimal slope osgd$_j$ of the j-gyro drift error, and calculating a fine estimate of the optimal transformation matrix (step 130) by updating the transformation matrix $C_{g_i}^{g_o}$ according to a set of recursive operations defined by the following:

$$C_{g_i,m}^{g_o} = C_{g_i,m-1}^{g_o} + \Sigma_{j \in \{x_g,y_g,z_g\}} osgd_j \Delta t_i \dot{C}_{g_i}^{g_o}(d\theta_j), \quad \text{Equation (12a)}$$

$$fsgd_{j,m} = fsgd_{j,m-1} + osgd_j, \quad \text{Equation (12b)}$$

where:
- $\Delta t_i$ is a time elapsed from the starting moment of initialization to the $i^{th}$ moment,
- $C_{g_i,m-1}^{g_o}$ is value the transformation matrix $C_{g_i}^{g_o}$ at an $(m-1)^{th}$ iteration of the fifth iterative operation, and
- $fsgd_{j,m-1}$ is a final estimate of the slope of the j-gyro drift error after m−1 iterations of the fifth iterative operation, wherein $fsgd_{j,0}$ is set to zero. In an exemplary embodiment, an average of two values of the slope of the j-gyro drift error for which the MSMs of the first row and the second row of the second residual matrix are minimized may be calculated to obtain the optimal slope $osgd_j$ of the j-gyro drift error.

Equation (12a) may be obtained by the first-order Taylor expansion of the transformation matrix $C_{g_i}^{g_o}$ about $d\theta_j$ by $osgd_j\Delta t_i$. The higher order expansion may also lead to similar results for estimation of the slope of the j-gyro drift error with a higher computational cost.

In an exemplary embodiment, minimizing the variations of the rows of the second residual matrix in steps 124, 126, and 128 may further include minimizing the variations of the rows of the second residual matrix with respect to a slope of the scale factor error of the j-gyroscope according to a sixth iterative operation. An $n^{th}$ iteration of the sixth iterative operation may include minimizing the MSM of the first row of the second residual matrix with respect to the slope of the j-gyro scale factor error and minimizing the MSM of the second row of the second residual matrix with respect to the slope of the j-gyro scale factor error by estimating an optimal slope $osgsf_j$ of the j-gyro scale factor error, and calculating a fine estimate of the optimal transformation matrix (step 130) by updating the transformation matrix $C_{g_i}^{g_o}$ according to a set of recursive operations defined by the following:

$$C_{g_i,n}^{g_o} = C_{g_i,n-1}^{g_o} + \Sigma_{j \in \{x_g,y_g,z_g\}} osgsf_j \Delta t_i d\theta_{j,i} \dot{C}_{g_i}^{g_o}(d\theta_j), \quad \text{Equation (13a)}$$

$$fsgsf_{j,n} = fsgsf_{j,n-1} + osgsf_j, \quad \text{Equation (13b)}$$

where:
- $C_{g_i,n-1}^{g_o}$ is an updated value of the transformation matrix $C_{g_i}^{g_o}$ at an $(n-1)^{th}$ iteration of the sixth iterative operation, and
- $fsgsf_{j,n-1}$ is a final estimate of the slope of the j-gyro scale factor error after n−1 iterations of the sixth iterative operation, wherein $fsgsf_{j,0}$ is set to zero. In an exemplary embodiment, an average of two values of the slope of the j-gyro scale factor error for which the MSMs of the first row and the second row of the second residual matrix are minimized may be calculated to obtain the optimal slope $osgsf_j$ of the j-gyro scale factor error.

Equation (13a) may be obtained by the first-order Taylor expansion of the transformation matrix $C_{g_i}^{g_o}$ about $d\theta_j$ by $osgsf_j\Delta t_i d\theta_{j,i}$. The higher order expansion may also lead to similar results for estimation of the slope of the j-gyro scale factor error with a higher computational cost.

In different implementations of the IMU initialization, the gyro frame and the accelerometer frame may be considered the same, or a transformation matrix between the two frames may be already known. However, in practice, an accurate mutual alignment of the two frames is difficult. Hence, corresponding axes of the two frames may not be exactly coincident, or the transformation matrix between the two frames may not be exactly accurate. Therefore, there may be some rotational misalignments between the two frames, or there may remain a small-angle transformation matrix between the two frames.

Figure 1E:
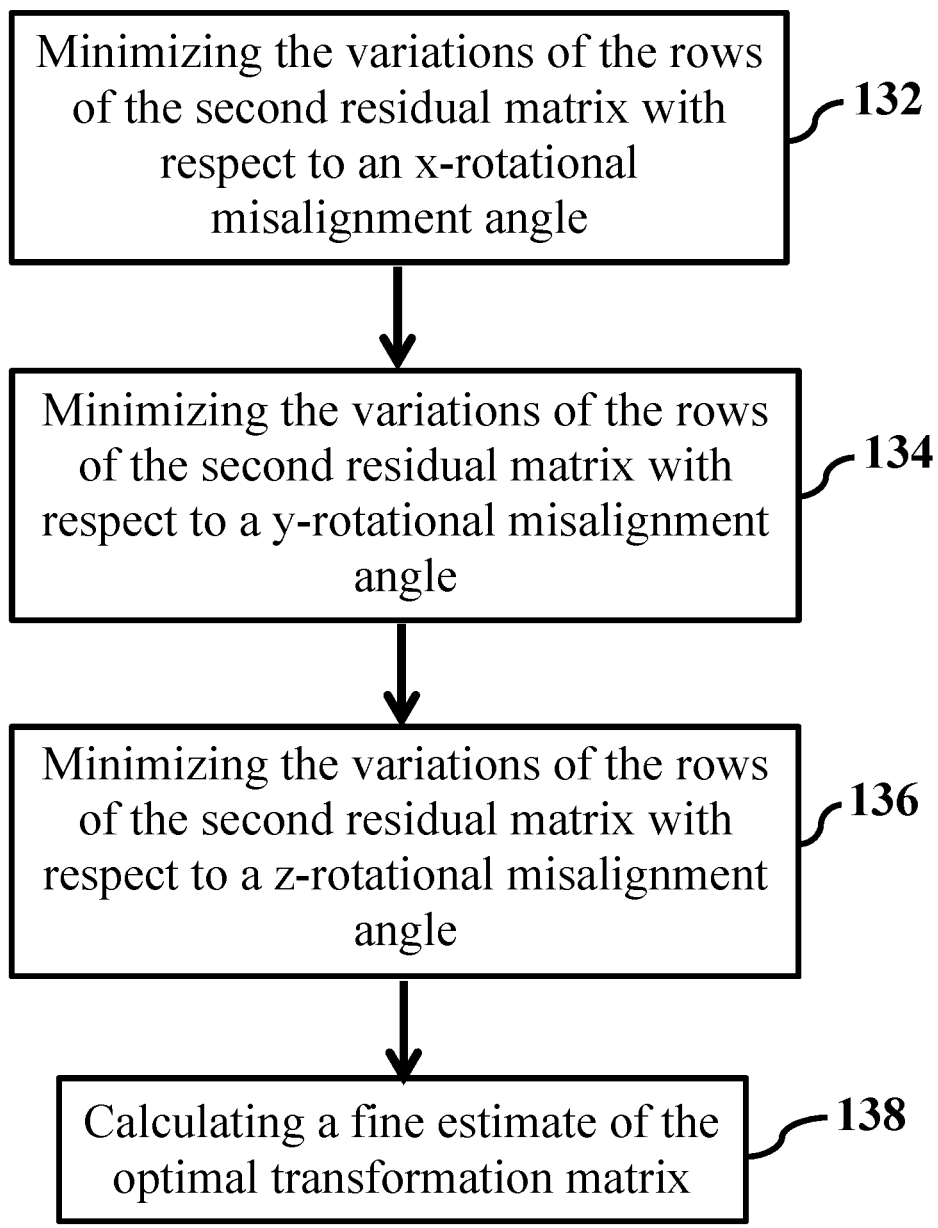
FIG. 1E shows a flowchart of exemplary additional steps of minimizing the variations of the rows of the residual of the gravity disturbance matrix, consistent with one or more exemplary embodiments of the present disclosure.

FIG. 1E shows a flowchart of exemplary additional steps of minimizing the variations of the rows of the second residual matrix (step 122), consistent with one or more exemplary embodiments of the present disclosure. In an exemplary embodiment, step 122 may further include minimizing the variations of the rows of the second residual matrix according to a seventh iterative operation. A $p^{th}$ iteration of the seventh iterative operation may include minimizing the variations of the rows of the second residual matrix with respect to an x-rotational misalignment angle by estimating an optimal x-rotational misalignment angle $ORMA_x$ (step 132), minimizing the variations of the rows of the second residual matrix with respect to a y-rotational misalignment angle by estimating an optimal y-rotational misalignment angle $ORMA_y$ (step 134), minimizing the variations of the rows of the second residual matrix with respect to a z-rotational misalignment angle by estimating an optimal z-rotational misalignment angle $ORMA_z$ (step 136), and calculating a fine estimate of the optimal transformation matrix by an optimal estimation of the transformation matrix $C_{a_i}^{g_i}$ (step 138). In an exemplary embodiment, an optimal estimate of the transformation matrix $C_{a_i}^{b_i}$ may be calculated according to a recursive operation defined by the following:

$$C_{a_i,p}^{g_i} = mul(C_{a_i,p-1}^{g_i}, R_x(ORMA_x), R_y(ORMA_y), R_z(ORMA_z)), \quad \text{Equation (14)}$$

where:
- $C_{a_i,p-1}^{g_i}$ is a value of the transformation matrix $C_{a_i}^{g_i}$ at a $(p-1)^{th}$ iteration of the seventh iterative operation, wherein $C_{a_i,0}^{g_i}$ is set to a predetermined transformation matrix which may be the identity matrix,
- $R_x(ORMA_x)$ is a rotation matrix representing a rotation about $x_a$-axis 202 by an angle of $ORMA_x$,
- $R_y(ORMA_y)$ is a rotation matrix representing a rotation about $y_a$-axis 204 by an angle of $ORMA_y$,
- $R_z(ORMA_z)$ is a rotation matrix representing a rotation about $z_a$-axis 206 by an angle of $ORMA_z$, and
- $mul(C_{a_i,p-1}^{g_i}, R_x(ORMA_x), R_y(ORMA_y), R_z(ORMA_z))$ is a multiplication of matrices $C_{a_i,p-1}^{g_i}$, $R_x(ORMA_x)$, $R_y(ORMA_y)$, and $R_z(ORMA_z)$. The order of the multiplication of the matrices may be arbitrarily chosen, and may remain unchanged during the iterations of the recursive operation of Equation (14).

In an exemplary embodiment, minimizing the variations of the rows of the second residual matrix with respect to the x-rotational misalignment angle (step 132) may include minimizing the MSM of the second row of the second residual matrix with respect to the x-rotational misalignment angle. In an exemplary embodiment, minimizing the variations of the rows of the second residual matrix with respect to the y-rotational misalignment angle (step 134) may include minimizing the MSM of the first row of the second residual matrix with respect to the y-rotational misalignment angle. In an exemplary embodiment, minimizing the variations of the rows of the second residual matrix with respect to the z-rotational misalignment angle (step 136) may include minimizing the MSM of the first row of the second residual matrix with respect to the z-rotational misalignment angle and minimizing the MSM of the second row of the second residual matrix with respect to the z-rotational misalignment angle. In an exemplary embodiment, an average of two values of the z-rotational misalignment angle for which the MSMs of the first row and the second row of the second residual matrix are minimized may be calculated to obtain the optimal z-rotational misalignment angle.

Example

In this example, an exemplary implementation of method 100 is demonstrated. A global positioning system (GPS) is used as the EPS for obtaining the positions of IMU 200 during the initialization of IMU 200. The initialization of IMU 200 is performed during three successive back-and-forth rotational motions. The first iterative operation is repeated until root mean squares between two successive converged row values of the gravity disturbance matrices for two final iterations becomes less than 1 mGal.

Figure 3:
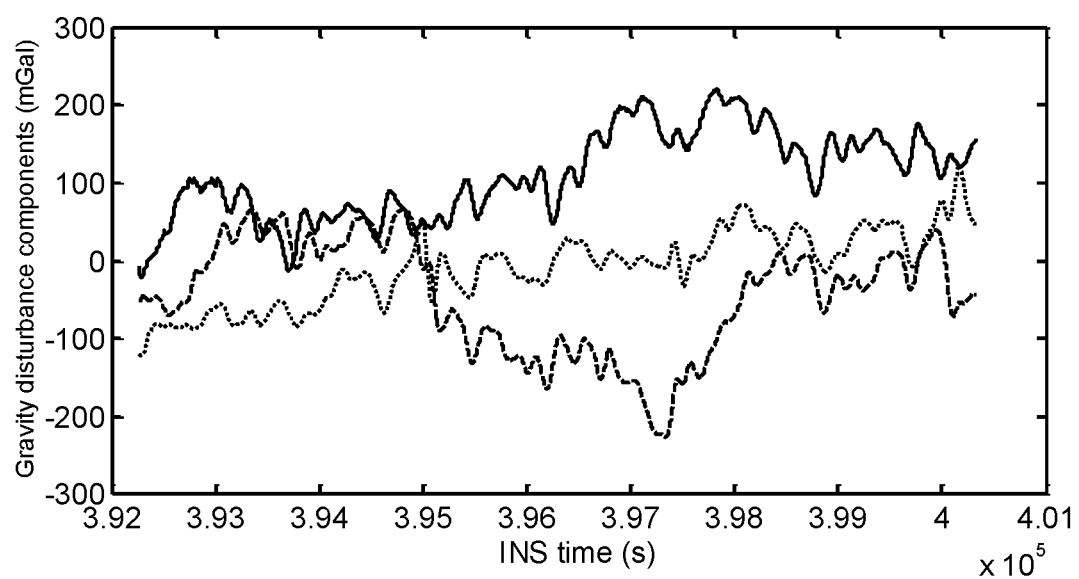
FIG. 3 shows the rows of the gravity disturbance matrix, consistent with one or more exemplary embodiments of the present disclosure.

FIG. 3 shows the rows of the gravity disturbance matrix in the navigation frame obtained from Equation (5) after obtaining a coarse estimate for the transformation matrix $C_{g_o}{}^i$. Values on a north component (dotted), an east component (dashed), and a down component (solid) of the gravity disturbance vector correspond to the first row, the second row and the third row of the gravity disturbance matrix in the navigation frame, respectively. As it is seen, the rows of the gravity disturbance matrix have been optimally estimated with minimum possible variations such that no large variation due to the three successive back-and-forth rotational motions is observed.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for initializing an inertial measurement unit (IMU) comprising a plurality of accelerometers and a plurality of gyroscopes, the IMU associated with an accelerometer frame and a gyro frame, the accelerometer frame comprising a first orthogonal set of axes, the first orthogonal set of axes comprising an $x_a$-axis, a $y_a$-axis, and a $z_a$-axis, the $z_a$-axis associated with a gravity vector of Earth, the gyro frame comprising a second orthogonal set of axes, the second orthogonal set of axes comprising an $x_g$-axis, a $y_g$-axis, and a $z_g$-axis, the accelerometer frame and the gyro frame corresponding to an inertial frame, the inertial frame associated with a local optional frame, the local optional frame comprising a third orthogonal set of axis, the third orthogonal set of axis comprising an x-axis, a y-axis, and a z-axis, the z-axis associated with the gravity vector, the method comprising:

generating variations in rows of a gravity disturbance matrix of the IMU by rotating the IMU about a rotation axis, a column of the gravity disturbance matrix comprising a gravity disturbance vector at an initialization moment of an initialization time, the gravity disturbance vector associated with the gravity vector; and estimating an optimal transformation matrix from the accelerometer frame to the inertial frame by minimizing the variations of the rows of the gravity disturbance matrix of the rotated IMU, wherein minimizing the variations of the rows of the gravity disturbance matrix comprises a first iterative operation, a $k^{th}$ iteration of the first iterative operation comprising:

minimizing variations of rows of one of the gravity disturbance matrix in the local optional frame and a first residual matrix with respect to a roll angle by estimating an optimal roll angle $OA_{roll}$, a column of the first residual matrix comprising a residual of the gravity disturbance vector in the local optional frame;

minimizing the variations of the rows of one of the gravity disturbance matrix in the local optional frame and the first residual matrix with respect to a pitch angle by estimating an optimal pitch angle OApitch;

minimizing the variations of the rows of one of the gravity disturbance matrix in the local optional frame and the first residual matrix with respect to a yaw angle by estimating an optimal yaw angle OAyaw; and calculating a coarse estimate of a transformation matrix $C_{g_o}^{\,i}$ from the gyro frame at a starting moment of initialization to the inertial frame according to a recursive operation defined by the following:

$$C_{g_o,k}^{\,i}=mul(C_{g_o,k-1}^{\,i},R_x(OA_{roll}),R_y(OA_{pitch}),R_z(OA_{yaw}))$$

where:

$C_{g_o,k-1}^{\,i}$ is a value of the transformation matrix $C_{g_o}^{\,i}$ at a $(k-1)^{th}$ iteration of the first iterative operation, wherein $C_{g_o,0}^{\,i}$ is set to an identity matrix, $R_x(OA_{roll})$ is a rotation matrix representing a rotation about the $x_g$-axis by an angle of $OA_{roll}$, $R_y(OA_{pitch})$ is a rotation matrix representing a rotation about the $y_g$-axis by an angle of $OA_{pitch}$, $R_z(OA_{yaw})$ is a rotation matrix representing a rotation about the $z_g$-axis by an angle of $OA_{yaw}$, and $mul(C_{g_o,k-1}^{\,i}, R_x(OA_{roll}), R_y(OA_{pitch}), R_z(OA_{yaw}))$ is a multiplication of $C_{g_o,k-1}^{\,i}$, $R_x(OA_{roll})$, $R_y(OA_{pitch})$, and $R_z(OA_{yaw})$.

2. The method of claim 1, wherein rotating the IMU about the rotation axis comprises rotating the IMU about an axis constructing an angle larger than 30 degrees with each of the $x_a$-axis, the $y_a$-axis, the $z_a$-axis, and the gravity vector.

3. The method of claim 1, wherein generating the variations in the rows of the gravity disturbance matrix comprises:

maintaining the IMU at a first orientation with respect to Earth for a first period of time;

rotationally displacing the IMU back-and-forth about the rotation axis for a second period of time;

maintaining the IMU at one of the first orientation and a second orientation with respect to Earth for a third period of time, the second orientation comprising a 180 degree rotation of the first orientation about the $z_a$-axis; and obtaining positions of the IMU by an external positioning system (EPS) during the first period of time, the second period of time, and the third period of time.

4. The method of claim 3, wherein rotationally displacing the IMU back-and-forth about the rotation axis comprises rotationally displacing the IMU back-and-forth about the rotation axis by an angle larger than 40 degrees.

5. The method of claim 1, wherein minimizing the variations of the rows of one of the gravity disturbance matrix in the local optional frame and the first residual matrix comprises estimating a transformation matrix $C_{g_i}^{\,g_o}$ from the gyro frame at an $i^{th}$ moment to the gyro frame at the starting moment of initialization according to an operation defined by the following:

$$C_{g_i}^{\,g_o}=C_{g_1}^{\,g_o}C_{g_2}^{\,g_1}C_{g_3}^{\,g_2}\ldots C_{g_i}^{\,g_{i-1}},$$

where $C_{g_i}^{\,g_{i-1}}$ is a transformation matrix from the gyro frame at the $i^{th}$ moment to the gyro frame at an $(i-1)^{th}$ moment, the transformation matrix $C_{g_i}^{\,g_{i-1}}$ given by the following:

$$C_{g_i}^{\,g_{i-1}}=(R_xR_yR_z+R_xR_zR_y+R_yR_xR_z+R_yR_zR_x+R_zR_xR_y+R_zR_yR_x)^T/6,$$

where:

$R_x$ is a rotation matrix representing a rotation about the $x_g$-axis by an incremental rotation angle $d\theta_x$ sensed by an $x_g$-gyroscope of the plurality of gyroscopes during a time increment from the $(i-1)^{th}$ moment to the $i^{th}$ moment, the $x_g$-gyroscope associated with the $x_g$-axis;

$R_y$ is a rotation matrix representing a rotation about the $y_g$-axis by an incremental rotation angle $d\theta_y$ sensed by a $y_g$-gyroscope of the plurality of gyroscopes during the time increment, the $y_g$-gyroscope associated with the $y_g$-axis; and $R_z$ is a rotation matrix representing a rotation about the $z_g$-axis by an incremental rotation angle $d\theta_z$ sensed by a $z_g$-gyroscope of the plurality of gyroscopes during the time increment, the $z_g$-gyroscope associated with the $z_g$-axis.

6. The method of claim 1, wherein minimizing the variations of the rows of the gravity disturbance matrix in the local optional frame comprises minimizing variations of rows of a matrix $[\delta g^l]$, a column of the matrix $[\delta g^l]$ at an $i^{th}$ moment given by the following:

$$\delta g^l=C_i^l\ddot{x}^i-C_i^lC_{g_o}^{\,i}C_{g_i}^{\,g_o}C_{a_i}^{\,g_i}a^a-C_i^l\gamma^i,$$

where:

$\delta g^l$ is the gravity disturbance vector in the local optional frame at the $i^{th}$ moment, $C_i^l$ is a transformation matrix from the inertial frame at the $i^{th}$ moment to the local optional frame at the $i^{th}$ moment, $\ddot{x}^i$ is an external positioning system (EPS)-derived acceleration vector in the inertial frame associated with the IMU at the $i^{th}$ moment, $C_{g_o}^{\,i}$ is a transformation matrix from the gyro frame at the starting moment of initialization to the inertial frame at the $i^{th}$ moment, $C_{g_i}^{\,g_o}$ is a transformation matrix from the gyro frame at the $i^{th}$ moment to the gyro frame at the starting moment, $C_{a_i}^{\,g_i}$ is a transformation matrix from the accelerometer frame at the $i^{th}$ moment to the gyro frame at the $i^{th}$ moment, $a^a$ is an IMU-sensed acceleration vector in the accelerometer frame at the $i^{th}$ moment, and $\gamma^i$ is a normal gravity vector corrected for a centrifugal acceleration of Earth in the inertial frame at the $i^{th}$ moment.

7. The method of claim 1, wherein minimizing the variations of the rows of the first residual matrix comprises minimizing variations of rows of a matrix [Err$^l$], a column of the matrix [Err$^l$] at an i$^{th}$ moment given by the following:

$$Err^l = C_i^l \ddot{x}^i - C_i^l C_{g_o}^i C_{g_i}^{g_o} C_{a_i}^{g_i} a^a - C_i^l \gamma^i - C_i^l \delta g_{EGD}^i,$$

where:
Err$^l$ is the residual of the gravity disturbance vector in the local optional frame at the i$^{th}$ moment,
$C_i^l$ is a transformation matrix from the inertial frame at the i$^{th}$ moment to the local optional frame at the i$^{th}$ moment,
$\ddot{x}^i$ is an external positioning system (EPS)-derived acceleration vector in the inertial frame associated with the IMU at the i$^{th}$ moment,
$C_{g_o}^i$ is a transformation matrix from the gyro frame at the starting moment of initialization to the inertial frame at the i$^{th}$ moment,
$C_{g_i}^{g_o}$ is a transformation matrix from the gyro frame at the i$^{th}$ moment to the gyro frame at the starting moment,
$C_{a_i}^{g_i}$ is a transformation matrix from the accelerometer frame at the i$^{th}$ moment to the gyro frame at the i$^{th}$ moment,
$a^a$ is an IMU-sensed acceleration vector in the accelerometer frame at the i$^{th}$ moment,
$\gamma^i$ is a normal gravity vector corrected for a centrifugal acceleration of Earth in the inertial frame at the i$^{th}$ moment, and
$\delta g_{EGD}^i$ is an external gravity disturbance vector in the inertial frame at the i$^{th}$ moment.

8. The method of claim 1, wherein:
minimizing the variations of the rows of one of the gravity disturbance matrix in the local optional frame and the first residual matrix with respect to the yaw angle comprises minimizing a mean spectral magnitude (MSM) of a first row of one of the gravity disturbance matrix in the local optional frame and the first residual matrix with respect to the yaw angle and minimizing the MSM of a second row of one of the gravity disturbance matrix in the local optional frame and the first residual matrix with respect to the yaw angle, the first row associated with the x-axis and the second row associated with the y-axis;
minimizing the variations of the rows of one of the gravity disturbance matrix in the local optional frame and the first residual matrix with respect to the roll angle comprises minimizing the MSM of a third row of one of the gravity disturbance matrix in the local optional frame and the first residual matrix with respect to the roll angle, the third row associated with the z-axis; and
minimizing the variations of the rows of one of the gravity disturbance matrix in the local optional frame and the first residual matrix with respect to the pitch angle comprises minimizing the MSM of the third row of one of the gravity disturbance matrix in the local optional frame and the first residual matrix with respect to the pitch angle.

9. The method of claim 1, further comprising updating the optimal transformation matrix by minimizing variations of rows of a second residual matrix, a column of the second residual matrix comprising a residual of the gravity disturbance vector in the accelerometer frame.

10. The method of claim 9, wherein minimizing the variations of the rows of the second residual matrix comprises a second iterative operation, an l$^{th}$ iteration of the second iterative operation comprising:

minimizing the variations of the rows of the second residual matrix with respect to a roll misalignment angle by estimating an optimal roll misalignment angle OMA$_{roll}$;
minimizing the variations of the rows of the second residual matrix with respect to a pitch misalignment angle by estimating an optimal pitch misalignment angle OMA$_{pitch}$;
minimizing the variations of the rows of the second residual matrix with respect to a yaw misalignment angle by estimating an optimal yaw misalignment angle OMA$_{yaw}$; and
calculating a fine estimate of the transformation matrix $C_{g_o}^i$ according to a recursive operation defined by the following:

$$C_{g_o,l}^i = mul(C_{g_o,l-1}^i, R_x(OMA_{roll}), R_y(OMA_{pitch}), R_z(OMA_{yaw})),$$

where:
$C_{g_o,l-1}^i$ is a value of the transformation matrix $C_{g_o}^i$ at an (l-1)$^{th}$ iteration of the second iterative operation, wherein $C_{g_o,0}^i$ is set to the coarse estimate of the transformation matrix $C_{g_o}^i$,
$R_x(OMA_{roll})$ is a rotation matrix representing a rotation about the $x_g$-axis by an angle of OMA$_{roll}$,
$R_y(OMA_{pitch})$ is a rotation matrix representing a rotation about the $y_g$-axis by an angle of OMA$_{pitch}$,
$R_z(OMA_{yaw})$ is a rotation matrix representing a rotation about the $z_g$-axis by an angle of OMA$_{yaw}$, and
mul($C_{g_o,l-1}^i$, $R_x(OMA_{roll})$, $R_y(OMA_{pitch})$, $R_z(OMA_{yaw})$) is a multiplication of $C_{g_o,l-1}^i$, $R_x(OMA_{roll})$, $R_y(OMA_{pitch})$, and $R_z(OMA_{yaw})$.

11. The method of claim 10, wherein:
minimizing the variations of the rows of the second residual matrix with respect to the roll misalignment angle comprises minimizing a mean spectral magnitude (MSM) of a first row of the second residual matrix with respect to the roll misalignment angle and minimizing the MSM of a second row of the second residual matrix with respect to the roll misalignment angle, the first row associated with the $x_a$-axis and the second row associated with the $y_a$-axis;
minimizing the variations of the rows of the second residual matrix with respect to the pitch misalignment angle comprises minimizing the MSM of the first row of the second residual matrix with respect to the pitch misalignment angle and minimizing the MSM of the second row of the second residual matrix with respect to the pitch misalignment angle; and
minimizing the variations of the rows of the second residual matrix with respect to the yaw misalignment angle comprises minimizing the MSM of the first row of the second residual matrix with respect to the yaw misalignment angle and minimizing the MSM of the second row of the second residual matrix with respect to the yaw misalignment angle.

12. The method of claim 9, wherein minimizing the variations of the rows of the second residual matrix comprises minimizing variations of rows of a matrix [Err$^a$], a column of the matrix [Err$^a$] at an i$^{th}$ moment given by the following:

$$Err^a = (C_{g_o}^i C_{g_i}^{g_o} C_{a_i}^{g_i})^{-1} (\ddot{x}^i - \gamma^i - \delta g_{EGD}^i) - a^a,$$

where:
Err$^a$ is the residual of the gravity disturbance vector in the accelerometer frame at the i$^{th}$ moment, $C_{g_o}{}^i$ is a transformation matrix from the gyro frame at the starting moment of initialization to the inertial frame at the $i^{th}$ moment, $C_{g_i}{}^{g_o}$ is a transformation matrix from the gyro frame at the $i^{th}$ moment to the gyro frame at the starting moment, $C_{a_i}{}^{g_i}$ is a transformation matrix from the accelerometer frame at the $i^{th}$ moment to the gyro frame at the $i^{th}$ moment, $\ddot{x}^i$ is an external positioning system (EPS)-derived acceleration vector in the inertial frame associated with the IMU at the $i^{th}$ moment, $\gamma^i$ is a normal gravity vector corrected for a centrifugal acceleration of Earth in the inertial frame at the $i^{th}$ moment, $\delta g_{EGD}{}^i$ is an external gravity disturbance vector in the inertial frame at the $i^{th}$ moment, and $a^a$ is an IMU-sensed acceleration vector in the accelerometer frame at the $i^{th}$ moment.

13. The method of claim 9, wherein minimizing the variations of the rows of the second residual matrix further comprises minimizing the variations of the rows of the second residual matrix with respect to a constant part of a drift error of a j-gyroscope of the plurality of gyroscopes according to a third iterative operation, the j-gyroscope associated with a j-axis of the gyro frame where $j \in \{x_g, y_g, z_g\}$, an $r^{th}$ iteration of the third iterative operation comprising:

minimizing the variations of the rows of the second residual matrix with respect to the constant part of the drift error of the j-gyroscope by estimating an optimal constant part $ocgd_j$ of the drift error of the j-gyroscope; and updating a transformation matrix $C_{g_i}{}^{g_o}$ from the gyro frame at an $i^{th}$ moment to the gyro frame at the starting moment of initialization according to a set of recursive operations defined by the following:

$$C_{g_i,r}{}^{g_o} = C_{g_i,r-1}{}^{g_o} + \Sigma_{j \in \{x_g, y_g, z_g\}} ocgd_j \dot{C}_{g_i}{}^{g_o}(d\theta_j),$$

$$fcgd_{j,r} = fcgd_{j,r-1} + ocgd_j,$$

where:

$C_{g_i,r-1}{}^{g_o}$ is a value of the transformation matrix $C_{g_i}{}^{g_o}$ at an $(r-1)^{th}$ iteration of the third iterative operation, wherein $C_{g_i}{}^{g_o}$ is set to $C_{g_i}{}^{g_o}$, $\dot{C}_{g_i}{}^{g_o}(d\theta_j)$ is a first derivative of the transformation matrix $C_{g_i}{}^{g_o}$ with respect to an incremental rotation angle $d\theta_j$ sensed by the j-gyroscope, and $fcgd_{j,r-1}$ is a final estimate of the constant part of the drift error of the j-gyroscope after $r-1$ iterations of the third iterative operation, wherein $fcgd_{j,0}$ is set to zero.

14. The method of claim 13, wherein:

minimizing the variations of the rows of the second residual matrix with respect to the constant part of the drift error of the j-gyroscope comprises minimizing a mean spectral magnitude (MSM) of a first row of the second residual matrix with respect to the constant part of the drift error of the j-gyroscope and minimizing the MSM of a second row of the second residual matrix with respect to the constant part of the drift error of the j-gyroscope, the first row associated with the $x_a$-axis and the second row associated with the $y_a$-axis.

15. The method of claim 9, wherein minimizing the variations of the rows of the second residual matrix further comprises minimizing the variations of the rows of the second residual matrix with respect to a constant part of a scale factor error of a j-gyroscope of the plurality of gyroscopes according to a fourth iterative operation, the j-gyroscope associated with a j-axis of the gyro frame where $j \in \{x_g, y_g, z_g\}$, a $q^{th}$ iteration of the fourth iterative operation comprising:

minimizing a mean spectral magnitude (MSM) of a first row of the second residual matrix with respect to the constant part of the scale factor error of the j-gyroscope and minimizing the MSM of a second row of the second residual matrix with respect to the constant part of the scale factor error of the j-gyroscope by estimating an optimal constant part $ocgsf_j$ of the scale factor error of the j-gyroscope, the first row associated with the $x_a$-axis and the second row associated with the $y_a$-axis; and updating a transformation matrix $C_{g_i}{}^{g_o}$ from the gyro frame at an $i^{th}$ moment to the gyro frame at the starting moment of initialization according to a set of recursive operations defined by the following:

$$C_{g_i,q}{}^{g_o} = C_{g_i,q-1}{}^{g_o} + \Sigma_{j \in \{x_g, y_g, z_g\}} ocgsf_j d\theta_{j,i} \dot{C}_{g_i}{}^{g_o}(d\theta_j),$$

$$fcgsf_{j,q} = fcgsf_{j,q-1} + ocgsf_j,$$

where:

$C_{g_i,q-1}{}^{g_o}$ is an updated value of the transformation matrix $C_{g_i}{}^{g_o}$ at a $(q-1)^{th}$ iteration of the fourth iterative operation, $d\theta_{j,i}$ is an incremental rotation angle sensed by the j-gyroscope during a time increment from an $(i-1)^{th}$ moment to the $i^{th}$ moment, $\dot{C}_{g_i}{}^{g_o}(d\theta_j)$ is a first derivative of the transformation matrix $C_{g_i}{}^{g_o}$ with respect to an incremental rotation angle $d\theta_j$ sensed by the j-gyroscope, and $fcgsf_{j,q-1}$ is a final estimate of the constant part of the scale factor error of the j-gyroscope after $q-1$ iterations of the fourth iterative operation, wherein $fcgsf_{j,0}$ is set to zero.

16. The method of claim 9, wherein minimizing the variations of the rows of the second residual matrix further comprises minimizing the variations of the rows of the second residual matrix with respect to a slope of a drift error of a j-gyroscope of the plurality of gyroscopes according to a fifth iterative operation, the j-gyroscope associated with a j-axis of the gyro frame where $j \in \{x_g, y_g, z_g\}$, an $m^{th}$ iteration of the fifth iterative operation comprising:

minimizing a mean spectral magnitude (MSM) of a first row of the second residual matrix with respect to the slope of the drift error of the j-gyroscope and minimizing the MSM of a second row of the second residual matrix with respect to the slope of the drift error of the j-gyroscope by estimating an optimal slope $osgd_j$ of the drift error of the j-gyroscope, the first row associated with the $x_a$-axis and the second row associated with the $y_a$-axis; and updating a transformation matrix $C_{g_i}{}^{g_o}$ from the gyro frame at an $i^{th}$ moment to the gyro frame at the starting moment of initialization according to a set of recursive operations defined by the following:

$$C_{g_i,m}{}^{g_o} = C_{g_i,m-1}{}^{g_o} + \Sigma_{j \in \{x_g, y_g, z_g\}} osgd_j \Delta t_i \dot{C}_{g_i}{}^{g_o}(d\theta_j),$$

$$fsgd_{j,m} = fsgd_{j,m-1} + osgd_j,$$

where:

$C_{g_i,m-1}{}^{g_o}$ is an updated value of the transformation matrix $C_{g_i}{}^{g_o}$ at an $(m-1)^{th}$ iteration of the fifth iterative operation, $\Delta t_i$ is a time elapsed from the starting moment of initialization to the $i^{th}$ moment, $\dot{C}_{g_i}^{g_o}(d\theta_j)$ is a first derivative of the transformation matrix $C_{g_i}^{g_o}$ with respect to an incremental rotation angle $d\theta_j$ sensed by the j-gyroscope, and $fsgd_{j,m-1}$ is a final estimate of the slope of the drift error of the j-gyroscope after m−1 iterations of the fifth iterative operation, wherein $fsgd_{j,0}$ is set to zero.

17. The method of claim 9, wherein minimizing the variations of the rows of the second residual matrix further comprises minimizing the variations of the rows of the second residual matrix with respect to a slope of a scale factor error of a j-gyroscope of the plurality of gyroscopes according to a sixth iterative operation, the j-gyroscope associated with a j-axis of the gyro frame where $j \in \{x_g, y_g, z_g\}$, an $n^{th}$ iteration of the sixth iterative operation comprising:

minimizing a mean spectral magnitude (MSM) of a first row of the second residual matrix with respect to the slope of the scale factor error of the j-gyroscope and minimizing the MSM of a second row of the second residual matrix with respect to the slope of the scale factor error of the j-gyroscope by estimating an optimal slope $osgsf_j$ of the scale factor error of the j-gyroscope, the first row associated with the $x_a$-axis and the second row associated with the $y_a$-axis; and updating a transformation matrix $C_{g_i}^{g_o}$ from the gyro frame at an $i^{th}$ moment to the gyro frame at the starting moment of initialization according to a set of recursive operations defined by the following:

$C_{g_i,n}^{g_o} = C_{g_i,n-1}^{g_o} + \Sigma_{j \in \{x_g, y_g, z_g\}} osgsf_j \Delta t_i d\theta_{j,i} \dot{C}_{g_i}^{g_o}(d\theta_j),$ $fsgsf_{j,n} = fsgsf_{j,n-1} + osgsf_j,$ where:

$C_{g_i,n-1}^{g_o}$ is an updated value of the transformation matrix $C_{g_i}^{g_o}$ at an $(n-1)^{th}$ iteration of the sixth iterative operation, $\Delta t_i$ is a time elapsed from the starting moment of initialization to the $i^{th}$ moment, $d\theta_{j,i}$ is an incremental rotation angle sensed by the j-gyroscope during a time increment from an $(i-1)^{th}$ moment to the $i^{th}$ moment, $\dot{C}_{g_i}^{g_o}(d\theta_j)$ is a first derivative of the transformation matrix $C_{g_i}^{g_o}$ with respect to an incremental rotation angle $d\theta_j$ sensed by the j-gyroscope, and $fsgsf_{j,n-1}$ is a final estimate of the slope of the scale factor error of the j-gyroscope after n−1 iterations of the sixth iterative operation, wherein $fsgsf_{j,0}$ is set to zero.

18. The method of claim 9, wherein minimizing the variations of the rows of the second residual matrix further comprises a seventh iterative operation, a $p^{th}$ iteration of the seventh iterative operation comprising:

minimizing the variations of the rows of the second residual matrix with respect to an x-rotational misalignment angle by estimating an optimal x-rotational misalignment angle $ORMA_x$;

minimizing the variations of the rows of the second residual matrix with respect to a y-rotational misalignment angle by estimating an optimal y-rotational misalignment angle $ORMA_y$;

minimizing the variations of the rows of the second residual matrix with respect to a z-rotational misalignment angle by estimating an optimal z-rotational misalignment angle $ORMA_z$; and calculating a transformation matrix $C_{a_i}^{g_i}$ from the accelerometer frame at an $i^{th}$ moment to the gyro frame at the $i^{th}$ moment according to a recursive operation defined by the following:

$C_{a_i,p}^{g_i} = mul(C_{a_i,p-1}^{g_i}, R_x(ORMA_x), R_y(ORMA_y), R_z(ORMA_z)),$ where:

$C_{a_i,p-1}^{g_i}$ is a value of the transformation matrix $C_{a_i}^{g_i}$ at a $(p-1)^{th}$ iteration of the seventh iterative operation, wherein $C_{a_i,0}^{g_i}$ is set to a predetermined transformation matrix, $R_x(ORMA_x)$ is a rotation matrix representing a rotation about the $x_a$-axis by an angle of $ORMA_x$, $R_y(ORMA_y)$ is a rotation matrix representing a rotation about the $y_a$-axis by an angle of $ORMA_y$, $R_z(ORMA_z)$ is a rotation matrix representing a rotation about the $z_a$-axis by an angle of $ORMA_z$, and $mul(C_{a_i,p-1}^{g_i}, R_x(ORMA_x), R_y(ORMA_y), R_z(ORMA_z))$ is a multiplication of $C_{a_i,p-1}^{g_i}, R_x(ORMA_x), R_y(ORMA_y)$, and $R_z(ORMA_z)$.

19. The method of claim 18, wherein:

minimizing the variations of the rows of the second residual matrix with respect to the z-rotational misalignment angle comprises minimizing a mean spectral magnitude (MSM) of a first row of the second residual matrix with respect to the z-rotational misalignment angle and minimizing the MSM of a second row of the second residual matrix with respect to the z-rotational misalignment angle, the first row associated with the $x_a$-axis and the second row associated with the $y_a$-axis;

minimizing the variations of the rows of the second residual matrix with respect to the x-rotational misalignment angle comprises minimizing the MSM of the second row of the second residual matrix with respect to the x-rotational misalignment angle; and minimizing the variations of the rows of the second residual matrix with respect to the y-rotational misalignment angle comprises minimizing the MSM of the first row of the second residual matrix with respect to the y-rotational misalignment angle.

* * * * *